(12) United States Patent
Vaisman

(10) Patent No.: US 9,739,200 B2
(45) Date of Patent: Aug. 22, 2017

(54) COOLING SYSTEMS FOR HIGH MACH APPLICATIONS

(71) Applicant: Rolls-Royce Corporation, Indianapolis, IN (US)

(72) Inventor: Igor Vaisman, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 144 days.

(21) Appl. No.: 14/583,996

(22) Filed: Dec. 29, 2014

(65) Prior Publication Data

US 2017/0058773 A1    Mar. 2, 2017

Related U.S. Application Data

(60) Provisional application No. 61/921,864, filed on Dec. 30, 2013.

(51) Int. Cl.
*F02C 7/16* (2006.01)
*F25B 1/10* (2006.01)
(Continued)

(52) U.S. Cl.
CPC ............... *F02C 7/16* (2013.01); *B64D 13/06* (2013.01); *F25B 1/10* (2013.01); *F25B 11/04* (2013.01);
(Continued)

(58) Field of Classification Search
CPC .......... F01K 7/32; F01K 25/10; F01K 25/103; Y10S 62/05; Y02T 50/56; F25B 9/00; F25B 9/002; F25B 9/02; F25B 9/06; F25B 9/10; F25B 11/00; F25B 11/02; F25B 13/00; B64D 13/06; B64D 13/08
(Continued)

(56) References Cited

U.S. PATENT DOCUMENTS 2,944,409 A * 7/1960 Chausson .............. B64D 13/08
                                                  62/125
3,097,504 A * 7/1963 Quick .................... B64D 13/06
                                                  62/241

(Continued)

FOREIGN PATENT DOCUMENTS

| DE | 1153632 B | 8/1963 |
| EP | 1927816 A1 | 6/2008 |
| EP | 2272757 A2 | 1/2011 |

OTHER PUBLICATIONS

European Search Report dated May 19, 2015.
English Abstract of DE 1153632 B.
English Abstract of EP 1927816 A1.

*Primary Examiner* — Laert Dounis
(74) *Attorney, Agent, or Firm* — Fishman Stewart PLLC

(57) ABSTRACT

A cooling system for an aircraft includes an air intake, a heat exchanger configured to receive air passing into the air intake when the aircraft is operating at Mach speed, and configured to receive compressed refrigerant from a first compressor at a first pressure, an evaporator positioned within the aircraft and configured to receive heated air from a compartment within the aircraft, at least one of an expansion device and an expansion machine, and the compressed refrigerant rejects heat in the heat exchanger to the air, expands in the at least one of the expansion device and the expansion machine, and receives heat in the evaporator from the heated air.

16 Claims, 7 Drawing Sheets

(51) Int. Cl.
*F25B 6/04* (2006.01)
*B64D 13/06* (2006.01)
*F25B 11/04* (2006.01)
*F25B 49/02* (2006.01)
*F25B 9/00* (2006.01)
*F25B 40/00* (2006.01)

(52) U.S. Cl.
CPC ........... *F25B 49/02* (2013.01); *F25B 6/04* (2013.01); *F25B 9/008* (2013.01); *F25B 40/00* (2013.01); *F25B 2309/005* (2013.01); *F25B 2309/061* (2013.01); *F25B 2400/0411* (2013.01); *F25B 2400/14* (2013.01); *F25B 2600/2501* (2013.01); *Y02T 50/56* (2013.01)

(58) Field of Classification Search
USPC ... 62/87, 113, 114, 239, 244, 498, 510, 512, 62/513, 524, 527; 60/647, 651, 671
See application file for complete search history.

(56) References Cited

U.S. PATENT DOCUMENTS

| | | | |
|---|---|---|---|
| 3,657,898 A * | 4/1972 | Ness | F01D 1/08 62/402 |
| 4,273,304 A | 6/1981 | Frosch et al. | |
| 4,434,624 A | 3/1984 | Cronin et al. | |
| 4,869,071 A | 9/1989 | Wehner et al. | |
| 4,934,154 A | 6/1990 | Altoz et al. | |
| 4,967,565 A | 11/1990 | Thomson et al. | |
| 5,014,518 A | 5/1991 | Thomson et al. | |
| 5,414,992 A | 5/1995 | Glickstein | |
| 6,199,387 B1 * | 3/2001 | Sauterleute | B64D 13/06 62/87 |
| 6,526,775 B1 * | 3/2003 | Asfia | B64D 13/06 62/401 |
| 6,698,214 B2 | 3/2004 | Chordia | |
| 6,923,011 B2 | 8/2005 | Manole | |
| 6,948,331 B1 | 9/2005 | Ho | |
| 7,069,731 B2 | 7/2006 | Hunt | |
| 7,178,362 B2 | 2/2007 | Collings | |
| 7,600,390 B2 | 10/2009 | Manole | |
| 7,621,137 B2 | 11/2009 | Aflekt et al. | |
| 7,721,569 B2 | 5/2010 | Manole | |
| 7,818,978 B2 | 10/2010 | Ducoulombier et al. | |
| 7,845,190 B2 | 12/2010 | Pearson | |
| 8,113,008 B2 | 2/2012 | Heinbokel et al. | |
| 8,327,651 B2 | 12/2012 | Finney et al. | |
| 2007/0006607 A1 * | 1/2007 | Hunt | B64D 13/06 62/402 |
| 2008/0127672 A1 * | 6/2008 | Ducoulombier | F25B 1/10 62/510 |
| 2010/0083678 A1 * | 4/2010 | Lifson | F25B 1/10 62/115 |
| 2010/0300126 A1 | 12/2010 | Gassen et al. | |
| 2011/0005244 A1 * | 1/2011 | Finney | B64D 13/08 62/87 |
| 2011/0146313 A1 | 6/2011 | Finckh et al. | |
| 2012/0000205 A1 | 1/2012 | Coffinberry et al. | |
| 2012/0192578 A1 | 8/2012 | Finney | |
| 2012/0297789 A1 | 11/2012 | Coffinberry | |
| 2015/0184898 A1 * | 7/2015 | Vaisman | F25B 5/02 62/115 |
| 2015/0354450 A1 * | 12/2015 | Vaisman | F02C 3/13 60/774 |

\* cited by examiner

COOLING SYSTEMS FOR HIGH MACH APPLICATIONS

CROSS-REFERENCE TO RELATED APPLICATIONS

This application claims priority to U.S. Provisional Patent Application No. 61/921,864, filed Dec. 30, 2013, the contents of which are hereby incorporated in their entirety.

FIELD OF TECHNOLOGY

An improved system and method of operating a cooling system in an aerospace application is disclosed, and more particularly, an improved system and method of operating the cooling system includes operating in a high-mach environment.

BACKGROUND

It has become increasingly desirable to improve cooling systems in aerospace applications. Typically, cooling systems provide air conditioning, refrigeration and freezer services, and the like for commercial and other aerospace systems. In general, various known options are available for providing cooling, but such options have drawbacks that limit the design options for aerospace applications.

To accommodate the wide range of possible ambient operating conditions of the aircraft, cooling systems for aerospace applications often use a gas-based system. That is, typical cooling systems include a relatively bulky and low efficiency gas-based system in order to cover the range of conditions that can be experienced during aircraft operation. Such systems include an ability to reject heat during operation to complete the thermodynamic cycle. However, some aircraft operate at above Mach 1, or the speed of sound, in which case the ability to reject heat may be limited due to the frictional component that can cause heating of air that may be used to reject heat.

Thus, cooling systems have been developed to provide alternatives for heat rejection during high Mach aircraft operation. One known option uses fuel or thermal storage units for cooling as high Mach heat sinks That is, a fuel or other thermal storage unit may be provided, to which heat may be rejected during operation of an aircraft at high Mach speeds. However, fuel storage units have limited capacity and limited operational time. And, as fuel is consumed, the reservoir to which the heat is rejected is reduced in volume, providing limited options for long duration flights.

Thus, there is a need to improve cooling in aircraft for high Mach operation.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary cooling system for an aircraft application is described herein, and various embodiments thereof. A cooling system for an aircraft includes an air intake, a heat exchanger configured to receive air passing into the air intake when the aircraft is operating at Mach speed, and configured to receive compressed refrigerant from a first compressor at a first pressure, an evaporator positioned within the aircraft and configured to receive heated air from a compartment within the aircraft, at least one of an expansion device and an expansion machine, and the compressed refrigerant rejects heat in the heat exchanger to the air, expands in the at least one of the expansion device and the expansion machine, and receives heat in the evaporator from the heated air.

Another exemplary illustration includes a method of operating a cooling system that includes a method of operating a cooling system. The method includes passing air, from an air intake in an aircraft that is operable at Mach speed, to a first heat exchanger, receiving refrigerant in the first heat exchanger from a first compressor and at a first pressure, expanding the refrigerant from the heat exchanger in at least one of an expansion device and an expansion machine, receiving refrigerant from the at least one of the expansion device and the expansion machine in an evaporator that receives heated air from a compartment of the aircraft, and rejecting heat in the heat exchanger to the air.

Figure 1A:
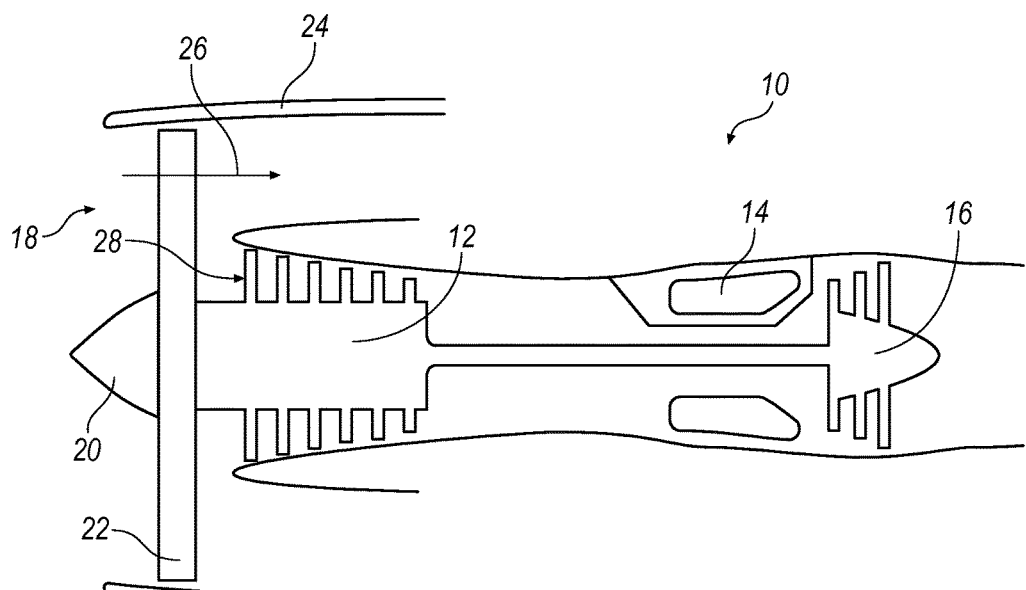
FIG. 1A is an illustration of a gas turbine engine employed in an aircraft and employing the improvements described herein.

FIG. 1A illustrates a schematic diagram of a gas turbine machine 10 that is a primary mover or thrust source for an aircraft, utilizing the improvements disclosed herein. The turbine machine 10 includes a primary compressor 12, a combustor 14 and a primary turbine assembly 16. A fan 18 includes a nosecone assembly 20, blade members 22 and a fan casing 24. The blade members 22 direct low pressure air to a bypass flow path 26 and to the compressor intake 28, which in turn provides airflow to compressor 12. Components of FIG. 1 generally correspond to components of an aircraft engine, and air intake to the engine, such as bypass air 26 may be used to reject heat to.

Figure 1B:
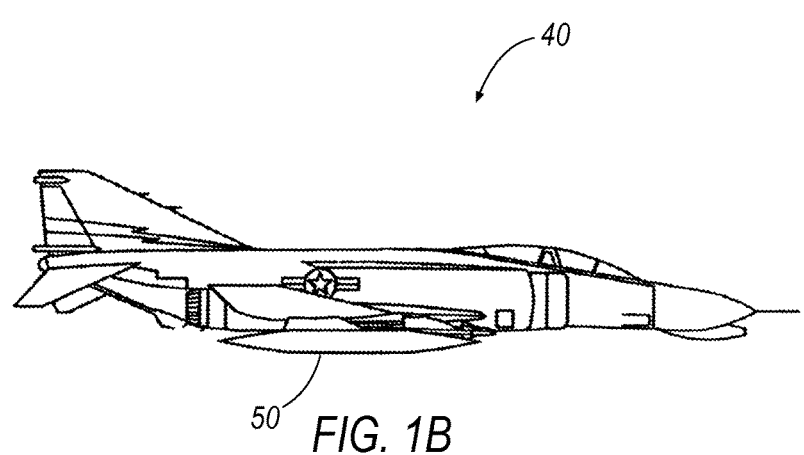
FIG. 1B is a side view of an aircraft having a RAM air intake.

FIG. 1B illustrates an aircraft 40 that includes an exemplary RAM air intake 50, which, in an alternative example, may be employed in cooling systems, such as exemplary cooling systems described herein. A RAM-air intake is any intake design which uses the dynamic air pressure created by vehicle motion to increase the static air pressure inside of the intake manifold on an engine, thus allowing a greater mass flow through the engine and hence increasing engine power. The RAM air intake works by reducing the intake air velocity by increasing the cross sectional area of the intake ducting. When gas velocity goes down the dynamic pressure is reduced while the static pressure is increased. The increased static pressure in a plenum chamber has a positive effect on engine power, both because of the pressure itself and the increased air density this higher pressure gives.

As will be described, air such as bypass air 26 or RAM air from intake 50 of aircraft 40 is used to cool a refrigerant for a compartment within aircraft 40. That is, when aircraft 40 is operating above Mach or at high Mach (such as Mach 3 and above, for example), incoming air is typically relatively hot. For instance, at Mach 1, stagnation temperature is approximately 360 K (195° F.). As another example, at Mach 3 the stagnation temperature is approximately 850 K (1070° F.). And, as yet another example, at Mach 5 the stagnation temperature is approximately 1820 K (2800° F.). Thus, to reject heat at such relatively high temperatures, the disclosed exemplary cooling systems operate across a temperature differential that spans from a rejection temperature that is above the air temperature at high Mach, to a heat absorption temperature that is typically approximately at ambient temperature. That is, the disclosed cooling systems provide cooling, in one example, that provide cooling at temperatures that are generally comfortable for human occupants of the aircraft, such as 20° C. In other examples the cooling may be provided for cooling electronics or other equipment that may generate heat at temperatures that are generally at ambient, or ranging from approximately 20-60° C.

To span the temperature differential between air temperatures for heat rejection and the relatively low temperatures for heat rejection (which may or may not be below the dome of a two-phase region for $CO_2$), the disclosed exemplary systems operate in a fashion generally analogous to cryogenic systems. For instance, a known cycle such as a Linde cycle operates in a regime where a Joule-Thompson coefficient is positive, and liquefaction occurs at extremely low temperatures. Another known cycle, such as a Claude cycle, is applicable and operates in a regime when the Joule-Thompson effect is negative. As such, known cryogenic systems operate across a very wide temperature differential in order to reject heat at ambient temperatures and absorb heat a low or cryogenic temperatures.

Figure 2:
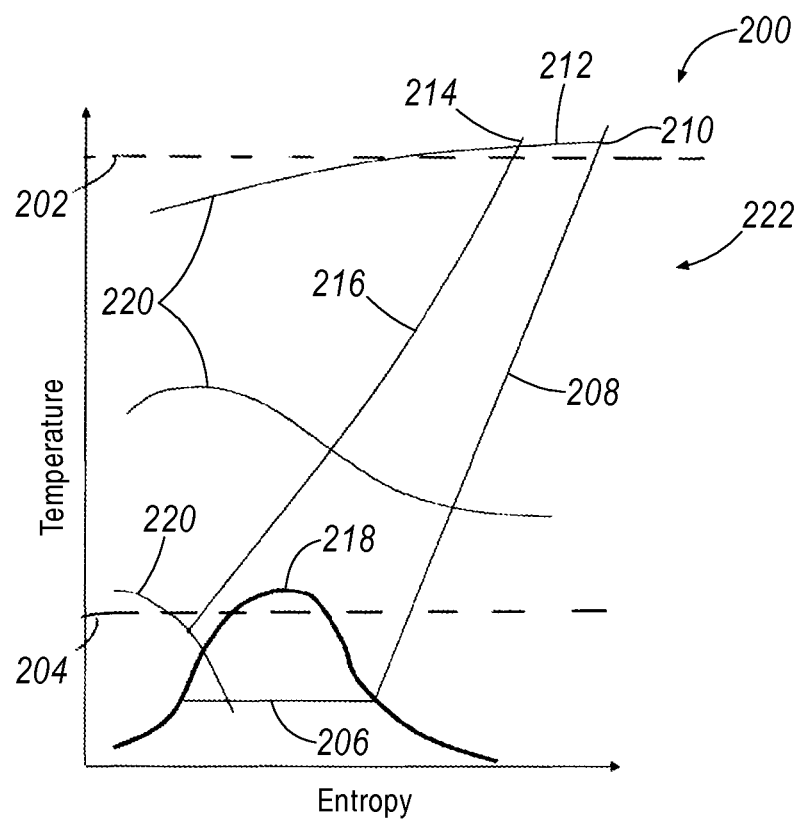
FIG. 2 illustrates exemplary thermodynamic operation of a cooling system between an air heat rejection temperature and an ambient heat absorption temperature.

An exemplary thermodynamic illustration 200 of a disclosed exemplary system is shown in FIG. 2, which in one example includes $CO_2$ as the working fluid or refrigerant. Illustration 200 spans from a heat rejection temperature 202 to a heat absorption temperature 204. When under the dome, heat absorption occurs 206 at a temperature below heat absorption temperature 204. Compression 208 causes refrigerant temperature 210 in excess of heat rejection temperature 202, and isenthalpic heat rejection occurs 212, at which point 214 refrigerant expansion 216 occurs, resulting, in this example, in a vapor outside the dome 218 and below heat absorption temperature 204. Isenthalps 220 are included for relative reference throughout cycle 222.

Figure 3:
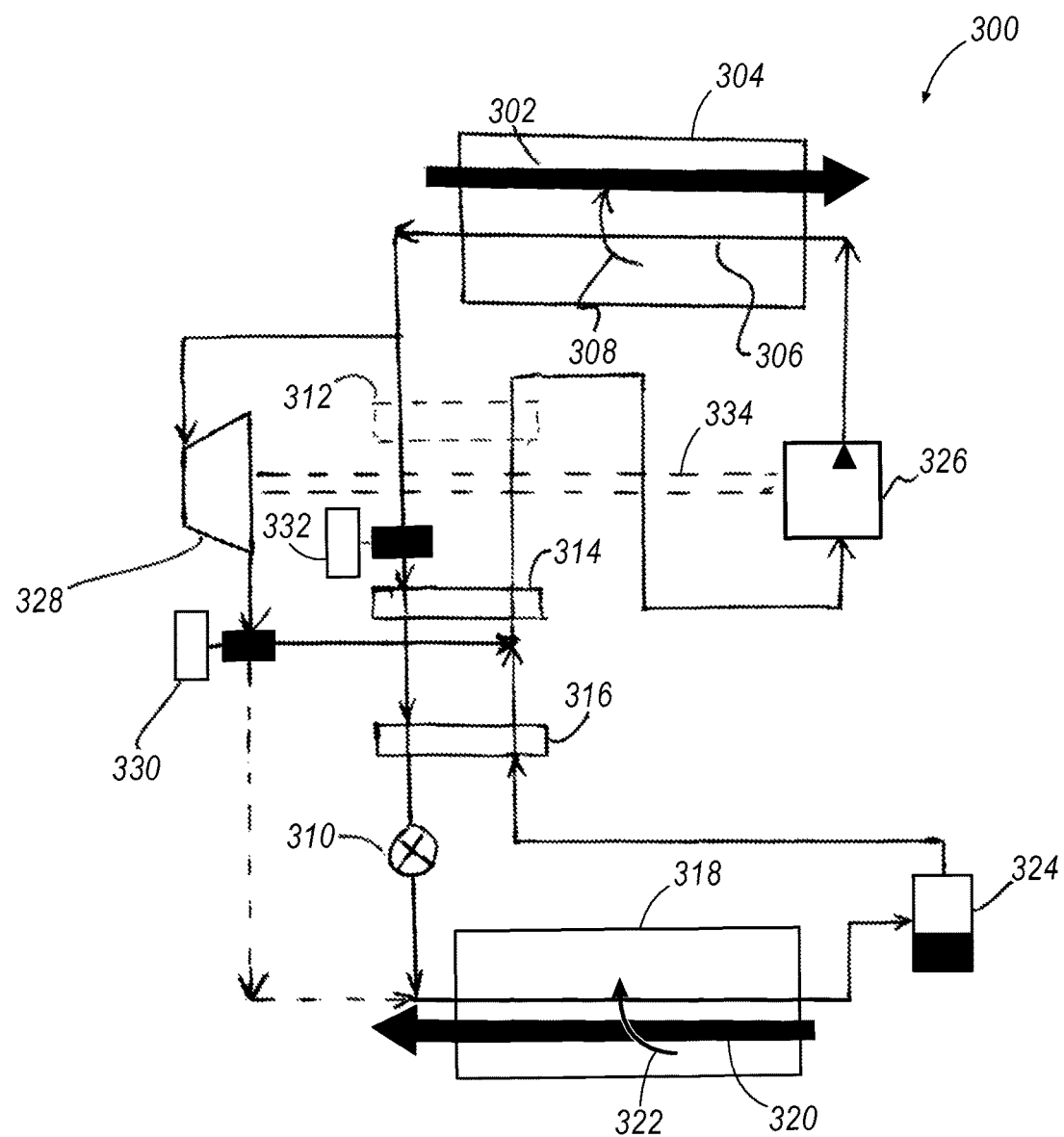
FIG. 3 illustrates an exemplary cooling system having one compression loop.

Referring to FIG. 3, an exemplary cooling system 300 is illustrated. System 300 includes cooling air 302 that arrives from an air intake, such as bypass air 26, which passes into a heat exchanger or gas cooler 304. A refrigerant, such as $CO_2$, passes into 306 heat exchanger 304, and rejects heat 308 to inlet air 302. Refrigerant passes to an expansion device 310, passing through recuperative heat exchangers 314, 316. In one example, an optional recuperative heat exchanger 312 may be included for additional heat recovery. When reaching expansion device 310, refrigerant expands and passes to a heat exchanger or evaporator 318. The recuperative heat exchangers typically result in a minimized temperature difference between streams at the hot end. A heat load 320 passes into heat exchanger 318 and thereby provides cooling 322 with the refrigerant at a temperature that is below that of heat load 320. Thus, if heat load 320 is generated by a human occupant or by electronics within an aircraft, the temperature of the refrigerant within heat exchanger is, in one example, 10° C. Refrigerant passes to a suction accumulator 324, passes through recuperative heat exchangers 316, 314, 312, and to a compressor 326. In one example, compressor 326 is driven by a motor (not shown). And, although the disclosed example includes three recuperative heat exchangers 312, 314, 316 it is contemplated that other exemplary systems may not include all three recuperative heat exchangers 312, 314, 316. And, the disclosed system includes passing refrigerant through expansion device 310 and causing two-phase or sub-critical operation, and liquefaction to occur under the dome.

However, in one example, system 300 may be operable in a super-critical operation. Thus, in one example, system 300 includes an expansion machine or turbine 328. In this example, turbine 328 may be selectively operable with solenoids or valves 330, 332 that prevent refrigerant from flowing to expansion valve 310, and instead pass refrigerant through turbine 328. In this operation, turbine 328 may thereby provide power to compressor 326 via a shaft 334. When the evaporating pressure reduces below the critical pressure, the three-way valve 330 closes the path to the evaporator and opens the path to the heat exchanger 316.

As such, system actively cools at high Mach heat temperatures, while absorbing heat at generally ambient temperatures, for a period of time that is not limited by a thermal reservoir such as a fuel tank.

Figure 4:
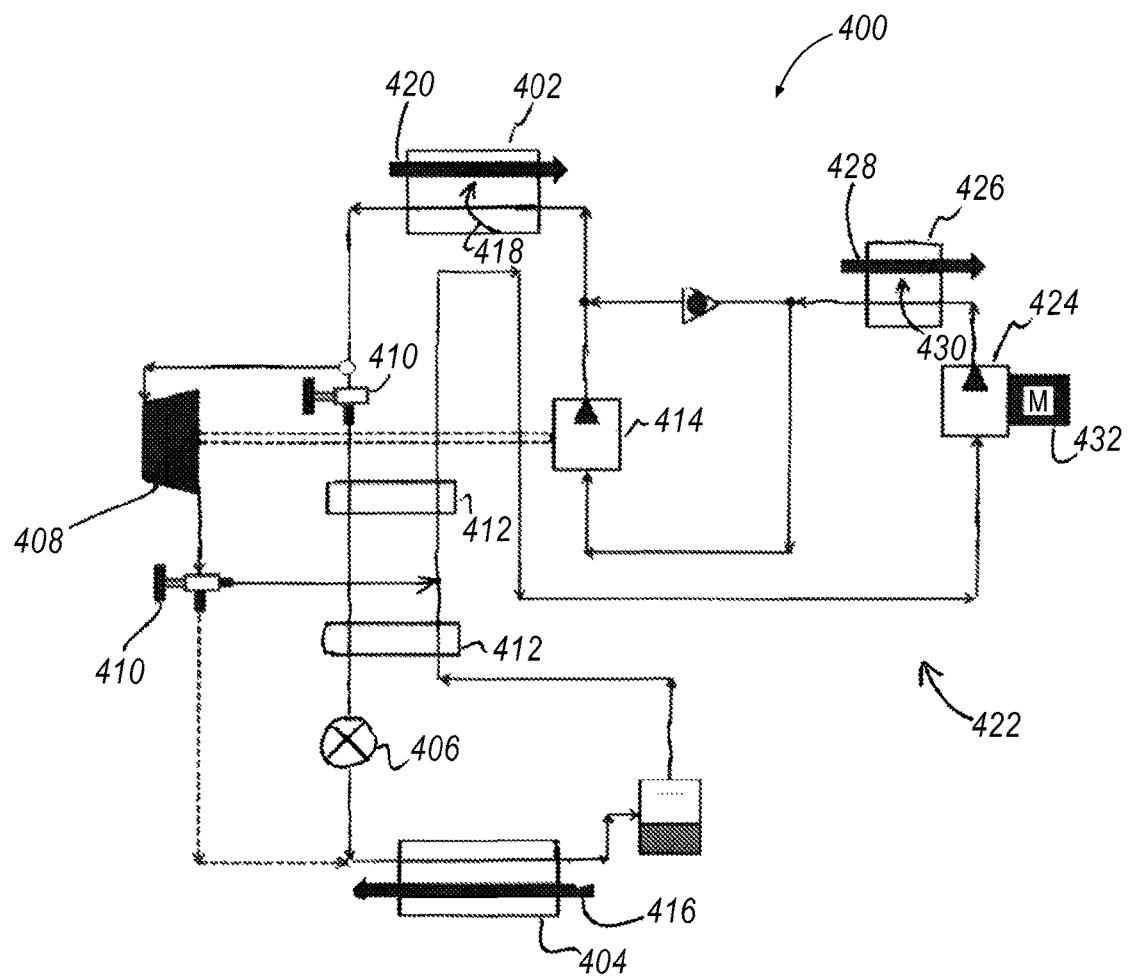
FIG. 4 illustrates an exemplary cooling system having two compression loops.

FIG. 4 illustrates another exemplary cooling system 400. System 400 includes heat exchanger or gas cooler 402, heat exchanger or evaporator 404, an expansion device 406, and an optional expansion machine or turbine 408. System 400 includes, in one example, solenoids or valves 410 recuperative heat exchangers 412, and a compressor 414. As with system 300 of FIG. 3, system 400 provides cooling to heat load 416 and rejects heat 418 to air that arrives from an intake and in an aircraft operating at high Mach. System 400 includes a compression circuit 422 in which refrigerant passes to a compressor 424, which passes through a second heat exchanger or gas cooler 426, which includes air 428 and to which heat is rejected 430. Compressor 424 includes a motor 432.

In operation, heat exchangers 402, 426 reject heat 418, 430 to air 420, 428. In one example, air 420, 428 in each heat exchanger is the same air and thus passes in one circuit to both heat exchangers 402, 426. Compressor 424 compresses refrigerant to a first pressure such that its temperature exceeds that of air 426 when the aircraft is traveling at Mach. Refrigerant then passes to compressor 414, where the refrigerant is compressed to a second pressure that is greater than the first pressure, and passes the compressed refrigerant to heat exchanger 402, for heat rejection 418. A check valve is positioned between compressors 432, 414 to prevent refrigerant backflow to compressor 424 in operation when compressor 414 is not operated, such as when the heat rejection temperature decreases, in which compressor 414 and expander 408 are off. In such operation, heat exchanger 426 may operate as a condenser.

Figure 5:
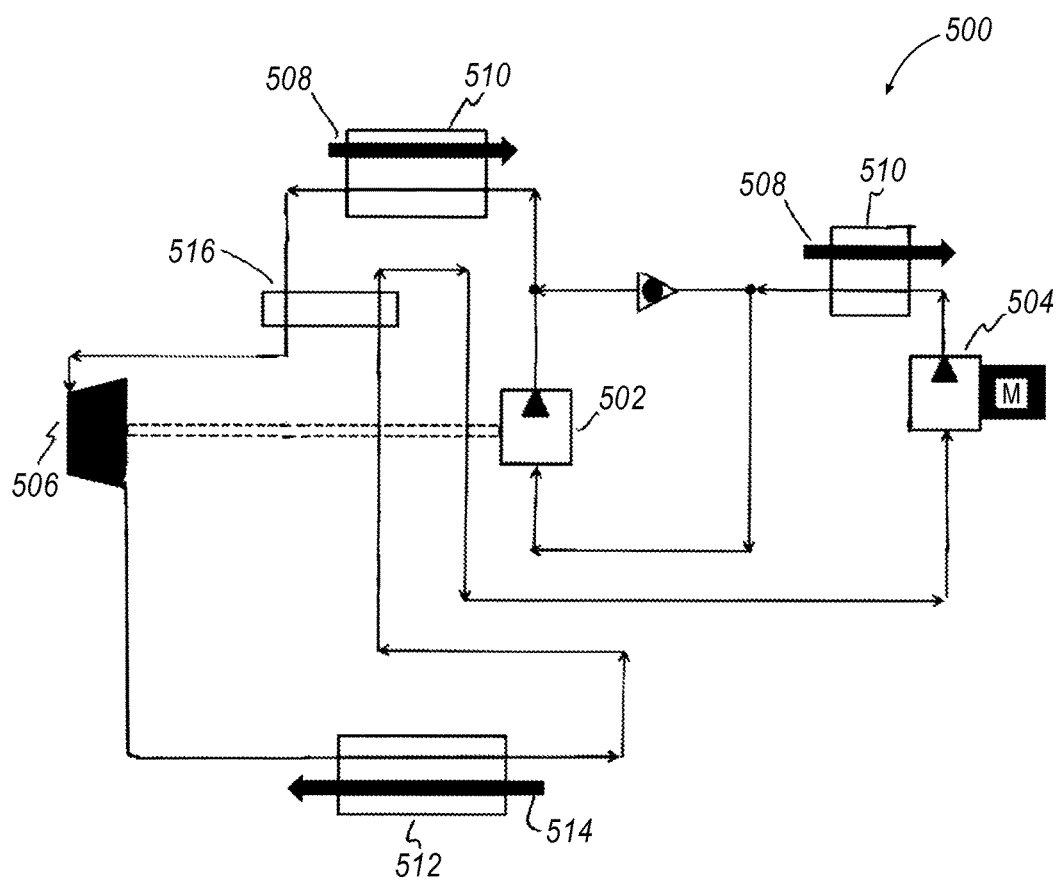
FIG. 5 illustrates an exemplary cooling system for only super critical operation.

Referring to FIG. 5, system 500 includes first and second compressors 502, 504, as disclosed in system 400 of FIG. 4. Compressor 502 is coupled to an expansion machine or turbine 506. Intake air 508 is passed into heat exchangers or gas coolers 510, and a heat rejection heat exchanger 512 provides heat from a heat load 514 at approximately ambient temperature. Recuperative heat exchanger 516 provides recuperative heat recovery. In this example, and contrary to the systems 300, 400, only turbine 508 is included, which thereby provides cooling for a super critical operation only. That is, because an expansion valve or device is not included, such system is a simplified system, and only super critical operation is provided by system 500.

Figure 6:
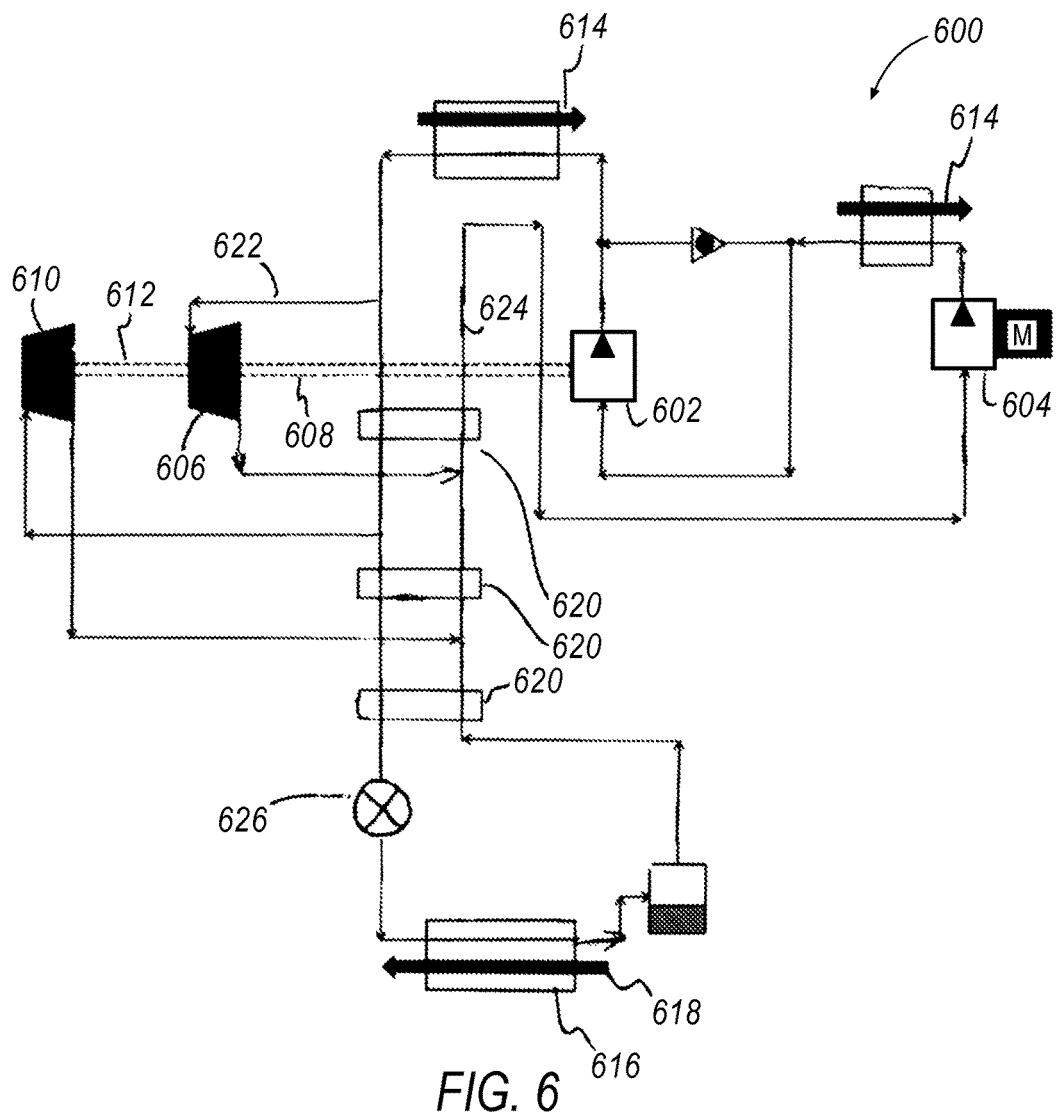
FIG. 6 illustrates a system having two expansion loops for providing augmented power to extend the temperature differential in the cooling system.

Referring to FIG. 6, system 600 includes first and second compressors 602, 604, as disclosed in system 400 of FIG. 4. Compressor 602 is coupled to an expansion machine or turbine 606 via a shaft 608, and to a second expansion machine or turbine 610 via a second shaft 612. Intake air 614 is passed into heat exchangers or gas coolers 614, and a heat rejection heat exchanger 616 provides heat from a heat load 618 at approximately ambient temperature. Recuperative heat exchangers 620 provide recuperative heat recovery.

In operation, two-stage expansion occurs in that a first line 622 passes refrigerant from heat exchanger 614, to a return line 624, and to second compressor 604. Turbine 606 also provides power to compressor 602. Second turbine 610 provides auxiliary power to compressor 602 via shaft 612, and likewise passes refrigerant from heat exchanger 614, to return line 624, and to second compressor 604. In such fashion, additional expansion occurs in comparison to, for instance, system 400 of FIG. 4, while refrigerant passes to expansion device 626, providing cooling to heat exchanger 616. Thus, the added expander 610 and related recuperative heat exchangers 620 further extend the temperature differential in the cooling system. Optionally, expanders 610 and 606 may power compressor 604; compressor 602 may be driven by an electrical motor (not shown) or any other available prime mover. The other option—one expander and a drive may power only one compressor stage; the second compressor and an additional drive may power the other compressor stage. Also, all rotating components and a drive may be placed on one shaft.

Figure 7:
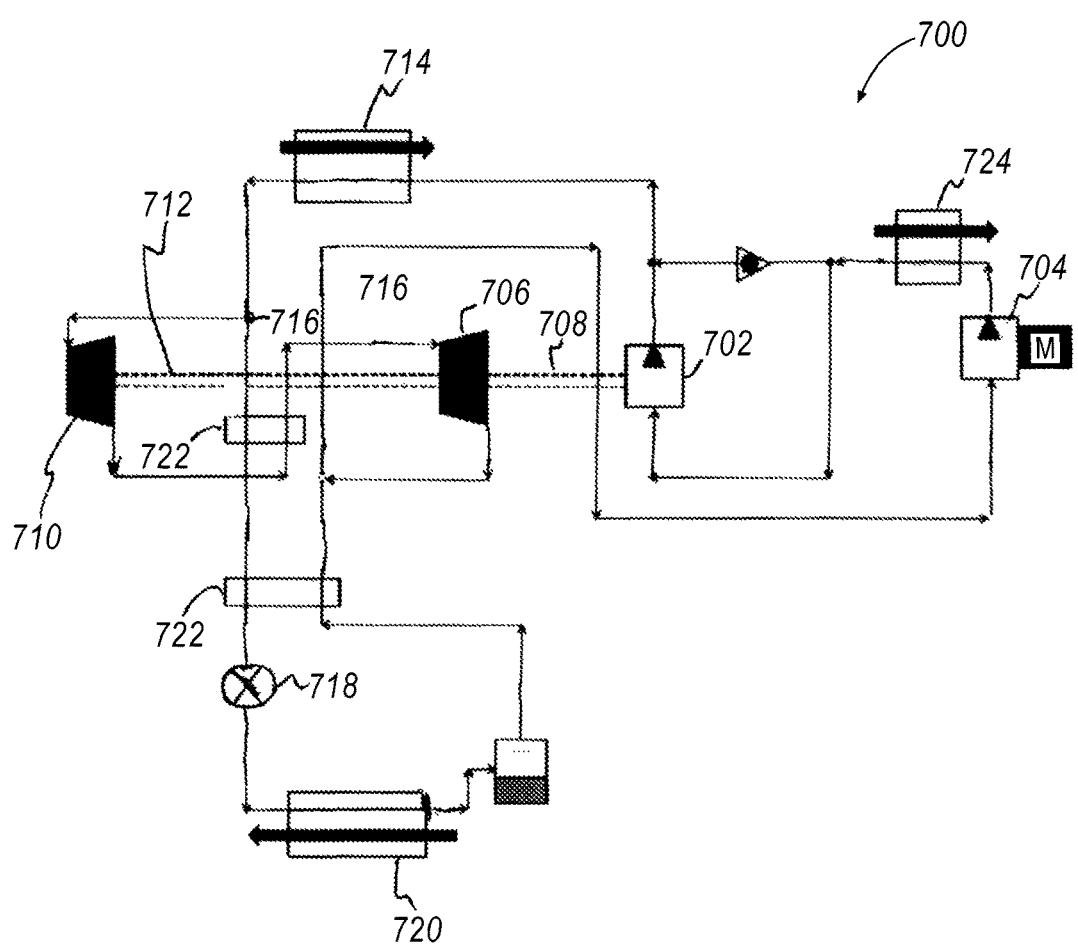
FIG. 7 illustrates a system having two expansion loops for providing augmented power to extend a temperature differential across which the cooling system may operate, while augmenting expansion capability.

Referring to FIG. 7, system 700 includes first and second compressors 702, 704. First compressor 702 is coupled to a first expander or turbine 706 via a shaft 708, and a second expander or turbine 710 is coupled to first turbine 706 via a shaft 712. Second turbine 710 provides auxiliary power to first turbine 706. Second turbine 710 receives refrigerant from a heat exchanger or gas cooler 714, and provides the refrigerant to the first turbine 706. Refrigerant from an inlet 716 of turbine 710 passes to an expansion device 718, which provides cooling to heat a heat exchanger 720. In operation, power is extracted from both turbines 710, 706, providing power to first compressor 702, while also providing refrigerant to heat exchanger 720, while recuperative heat exchangers 722 provide recuperative heat exchange between stages. A heat exchanger 724 receives air and provides cooling between compression stages 704, 702. In such fashion, the additional expander 710 and related recuperative heat exchangers 722 extend a temperature differential across which the cooling system may operate, while including additional expansion capability.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A cooling system for an aircraft, comprising:
   an air intake;
   a first heat exchanger configured to receive air passing into the air intake when the aircraft is operating at Mach speed, and configured to receive compressed refrigerant from a first compressor at a first pressure;
   an evaporator positioned within the aircraft and configured to receive heated air from a compartment within the aircraft;
   at least one of an expansion valve and a turbine; and
   the compressed refrigerant rejects heat in the first heat exchanger to the air, expands in the at least one of the expansion valve and the turbine, and receives heat in the evaporator from the heated air;
   wherein the at least one of the expansion valve and the turbine further comprise:
   a first turbine configured to provide a first power, and output the refrigerant to the first compressor;
   a second turbine coupled to the first turbine via a shaft, wherein the second turbine provides a second power to the first turbine, and output the refrigerant to the first compressor; and
   an expansion valve configured to receive refrigerant from the first heat exchanger and expand the refrigerant to provide expanded refrigerant to the evaporator.

2. The cooling system of claim 1, wherein the compartment is heated at least with human body heat.

3. The cooling system of claim 1, wherein the cooling system includes at least one of the first and second turbines and the expansion valve arranged in parallel with one another, and further comprising a plurality of valves that direct the refrigerant through:
   the expansion valve during a sub-critical operation; and
   the turbine during a super critical operation.

4. The cooling system of claim 1, comprising a second compressor configured to compress the refrigerant to a second pressure that is lower than the first pressure, pass the refrigerant to a second heat exchanger that is configured to receive the air passing into the air intake when the aircraft is operating at the Mach speed, and pass the refrigerant to the first compressor.

5. The cooling system of claim 1, wherein the refrigerant is maintained wholly in a super critical mode from the first heat exchanger through at least one of the first and second turbines.

6. The cooling system of claim 1, further comprising a second compressor configured to receive refrigerant from the first compressor and at the first pressure, after having passed through a second heat exchanger, and output the refrigerant at a second pressure that is greater than the first pressure.

7. A method of operating a cooling system, the method comprising:
   passing air, from an air intake in an aircraft that is operable at Mach speed, to a first heat exchanger;
   receiving refrigerant in the first heat exchanger from a first compressor and at a first pressure;
   expanding the refrigerant from the first heat exchanger in at least one of an expansion valve and a turbine;
   receiving refrigerant from the at least one of the expansion valve and the turbine in an evaporator that receives heated air from a compartment of the aircraft; and
   rejecting heat in the first heat exchanger to the air;

wherein the at least one of the expansion valve and the turbine further comprise:
a first turbine configured to provide a first power, and output the refrigerant to the first compressor;
a second turbine coupled to the first turbine via a shaft, wherein the second turbine provides a second power to the first turbine, and output the refrigerant to the first compressor; and
an expansion valve configured to receive refrigerant from the first heat exchanger and expand the refrigerant to provide expanded refrigerant to the evaporator.

8. The method as claimed in claim 7, wherein the compartment is heated at least with human body heat.

9. The method as claimed in claim 7, wherein the cooling system includes at least one of the first and second turbines and the expansion valve arranged in parallel with one another, and further comprising operating a plurality of valves that direct the refrigerant through:
the expansion valve during a sub-critical operation; and
the turbine during a super critical operation.

10. The method as claimed in claim 7, comprising:
compressing the refrigerant to a second pressure that is lower than the first compressor in a second compressor;
passing the refrigerant to a second heat exchanger that is configured to receive the air passing into the air intake when the aircraft is operating at the Mach speed; and
passing the refrigerant to the first compressor.

11. The method as claimed in claim 7, further comprising maintaining the refrigerant wholly in a super critical mode from the first heat exchanger through the at least one of the first and second turbines.

12. The method as claimed in claim 7, further comprising a second compressor configured to receive refrigerant from the first compressor and at the first pressure, after having passed through a second heat exchanger, and output the refrigerant at a second pressure that is greater than the first pressure.

13. An aircraft comprising:
an air intake; and
a cooling system for the aircraft, the cooling system comprising:
a first heat exchanger configured to receive air passing into the air intake when the aircraft is operating at Mach speed, and configured to receive compressed refrigerant from a first compressor at a first pressure;
an evaporator positioned within the aircraft and configured to receive heated air from a compartment;
at least one of an expansion valve and a turbine; and
the compressed refrigerant rejects heat in the first heat exchanger to the air, expands in the at least one of the expansion valve and the turbine, and receives heat in the evaporator from the heated air;
wherein the at least one of the expansion valve and the turbine further comprise:
a first turbine configured to provide a first power, and output the refrigerant to the first compressor;
a second turbine coupled to the first turbine via a shaft, wherein the second turbine provides a second power to the first turbine, and output the refrigerant to the first compressor;
an expansion valve configured to receive refrigerant from the first heat exchanger and expand the refrigerant to provide expanded refrigerant to the evaporator; and
a second compressor configured to receive refrigerant from the first compressor and at the first pressure, after having passed through a second heat exchanger, and output the refrigerant at a second pressure that is greater than the first pressure.

14. The aircraft of claim 13, wherein the compartment is a compartment of the aircraft that is heated at least with human body heat.

15. The aircraft of claim 13, wherein the cooling system includes at least one of the first and second turbines and the expansion valve arranged in parallel with one another, and further comprising a plurality of valves that direct the refrigerant through:
the expansion valve during a sub-critical operation; and
the turbine during a super critical operation.

16. The aircraft of claim 13, wherein the refrigerant is maintained wholly in a super critical mode from the first heat exchanger through at least one of the first and second turbines.

* * * * *